No. 776,570.
Patented December 6, 1904.

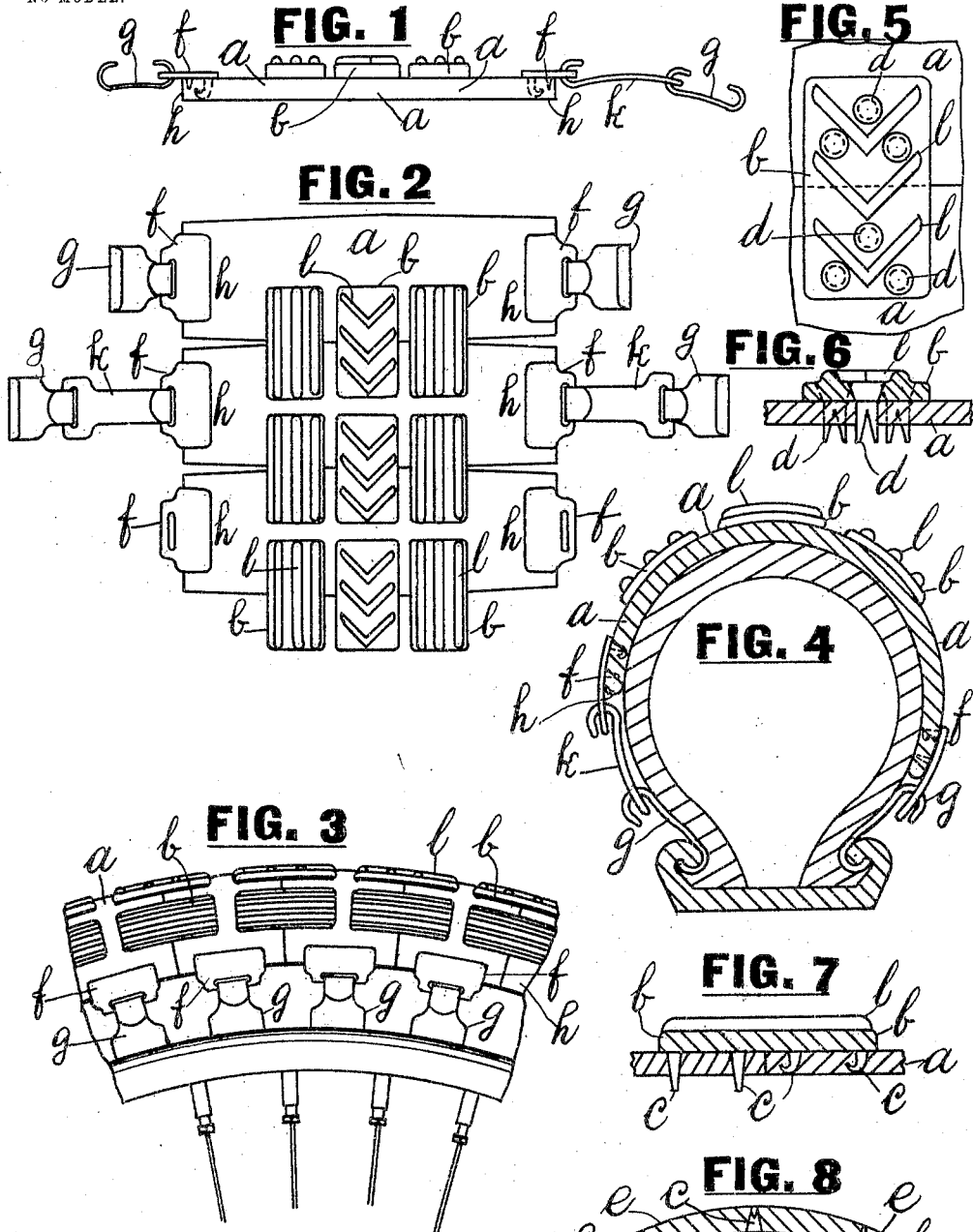

UNITED STATES PATENT OFFICE.

ROUGHSEDGE WALLWORK, OF MANCHESTER, ENGLAND.

PROTECTIVE COVER FOR TIRES.

SPECIFICATION forming part of Letters Patent No. 776,570, dated December 6, 1904.

Application filed September 12, 1904. Serial No. 224,133. (No model.)

*To all whom it may concern:*

Be it known that I, ROUGHSEDGE WALLWORK, a subject of the King of Great Britain, residing at Manchester, in the county of Lancaster, England, have invented new and useful Improvements in Covers for Protecting the Tires of Vehicles, (for which I have made application for patent in Great Britain, No. 25,085, bearing date November 18, 1903,) of which the following is a specification.

The improvements relate to covers for protecting the tires of vehicles, more particularly pneumatic tires, and have for object preventing the same from being punctured or damaged by obstructions and also to obviate side slipping or skidding by a method hereinafter to be described. To accomplish this and to effect my improvements, I prepare comparatively small pieces, preferably of leather, rubber, combinations of rubber or substitutes and canvas, or other suitable materials, cut or formed to such a shape that when joined together at the wearing-surface they will form a band round the tire lengthwise and will present tabs or flaps on each side laterally, by means of which the cover may be attached when complete. I join these pieces together at such wearing-surface by means of metal plates provided with spikes, teeth, or prongs, which plates extend from one piece of leather or other material to the next and act as fasteners for holding the same together by the spikes or prongs aforesaid being passed through and clenched or by being driven into the material. These metallic plates of any suitable shape may be of any required number or size, and in cases where the joined pieces of leather or other material are of sufficient length to permit of it I may employ additional metallic plates between one set of joining-plates and the next. By projecting above the surface of the material forming the cover these plates will provide a gripping as well as a durable surface for overcoming the tendency to side slipping or skidding of the wheels of the vehicle. If desirable, I may provide prongs or spikes on both faces of the metal fasteners holding the pieces together, so that another substance other than metallic may be attached thereto for the actual tread or wearing-surface. I may attach the protective cover so formed to the tire by means of cords, wire, or hooks, or a combination of such means, which may be accomplished by lacing or otherwise connecting the tabs or side flaps of the cover to the rim of the wheel or to the spokes, as will be well understood, whether such rim be composed of metal or wood, or both.

Variations in detail may be made, such as in the number of pieces of material to a cover, the composition thereof, the length and shape of the side flaps or tabs, the number and shape of the metal fasteners connecting the same together, as well as in the mode of attachment to the rim of the wheel, without departing from the peculiar character of the invention; but that the improvements may be better understood I will, with the aid of the accompanying drawings, proceed more fully to describe means employed by me.

In the drawings, Figure 1 is an end view, and Fig. 2 a plan, of part of a tire-cover opened out flat and provided and constructed in accordance with one form of my invention, such figures showing two means of hook attachment to the tire. Fig. 3 shows a portion of a wheel tire and rim with this cover in position thereon; and Fig. 4 is a cross-section of a tire, indicating the modes of attachment of the cover according to Figs. 1 and 2, while Figs. 5, 6, 7, and 8 show details hereinafter to be described.

The same letters indicate corresponding parts wherever they occur.

$a$ represents the pieces of leather or other suitable material joined together at the wearing-surface by metal plates $b$, provided with teeth or prongs. These teeth in the case of Fig. 7 are formed at $c$ in one piece with the plate $b$; but in Figs. 5 and 6 loose split rivets or fasteners $d$ are passed through holes in the plate. The plates $b$ extend from one piece of material $a$ to the next—as, for example in Fig. 2—and act as fasteners by the spikes or prongs being passed through and clenched, as in Fig. 7, or by being driven into the material. In Fig. 8 the plate $b$ is formed with spikes or prongs $c$ on both faces, so that another substance, $e$, other than metallic, may be attached thereto for the actual tread or wearing-surface. In Figs. 1 to 4 the side flaps or tabs *h* of the material *a* are provided with lugs *f*, with which are engaged double hooks *g*, suitably curved to conform to the swell of the tire, which hooks are introduced between the tire and the rim and grip the beading of the latter.

Where larger tires are employed or where the cover is formed to envelop the tire less completely, as shown at the left-hand portion of Fig. 4, supplementary hooks *k* may be interposed between the hooks *g* and the cover. The pattern projections *l* of the plates *b* may be of any suitable formation and design.

Having now particularly described and ascertained the nature of my said invention, and in what manner the same is to be performed, I declare that what I claim is—

1. A tire-cover comprising short pieces of material, metallic plates joining said pieces together at the wearing-surface, spikes teeth or prongs connecting said pieces to said metallic plates, and means, at the sides of said pieces, for attachment to the tire or rim of the wheel, for the purpose and in manner substantially as herein set forth.

2. In tire-covers, the combination of pieces of material *a*, metallic plates *b*, joining said pieces together at the wearing-surface, spikes *c*, connecting said plates *b*, to said pieces *a*, lugs *f*, attached to the sides of said pieces, and hooks *g*, engaging with said lugs, for the purpose and in manner substantially as herein set forth.

ROUGHSEDGE WALLWORK.

Witnesses:
 GEORGE FREDERICK GADD,
 ARTHUR GADD.